United States Patent Office 3,506,357
Patented Apr. 14, 1970

3,506,357
RAPID REMOTE SENSING BY SPECTRAL MATCHING
Graham R. Hunt, Winchester, Mass., assignor to the United States of America as represented by the Secretary of the Air Force
Filed Mar. 27, 1967, Ser. No. 626,675
Int. Cl. G01n 2/22; G01j 3/42
U.S. Cl. 356—51           3 Claims

ABSTRACT OF THE DISCLOSURE

A technique for determining the composition, temperature, and surface condition of a low energy level remotely located target material by infrared spectral matching in which the reflection spectra of a set of polished samples of different compositions is instrumentally compared with the emission spectrum from the source, the data being obtained almost instantaneously to prevent any variation of the intervening attenuator from affecting the spectral information data leaving the target area.

---

This invention relates to a technique for obtaining compositional data from a remote, low energy target and, more particularly, the invention is concerned with providing a method for determining composition, temperature and surface condition of a low energy level remotely located target by infrared spectral matching of the target with a known sample quickly enough so as not to be affected by a variable attenuator disposed between the target and the recording instrument.

The infrared region of the spectrum is capable of yielding the most definitive information concerning the gross composition of inorganic surface materials, because of the characterizing features which appear in their spectra as a result of transitions between the various molecular vibrational and lattice energy levels of the material. It follows, then, that the maximum information available, in a remote sensing situation, concerning the composition of a given surface, is contained in a complete (extended wavelength) high resolution infrared spectrum, independently of whether the spectrum is available as absorption, emission or reflection.

In a real situation, many factors militate against the acquisition of such an ideal spectrum, and these factors are particularly severe for the case of ground-based observations of extraterrestrial objects. In this case, the absorption, scattering and emission of the terrestrial atmosphere, which is unpredictably time-variable, both limits the range of observation to a few relatively small atmospheric windows, and produces an unknown attenuation of the target emission spectrum. Additionally, when the observed target is relatively cold, as is the case for the moon and planets, the length of time required to record a complete spectrum is frequently long enough to allow variations in atmospheric attenuation. The situation is aggravated still further when a target area is observed from an aircraft or orbiting spacecraft, because the target element observed at the beginning of the recording of the spectrum could be different from that observed by the time the end of the spectrum is reached. Thus, even in the simplest case of ground-based observations of the moon, spectra recorded from different areas at different times must be compared with extreme caution in order to avoid ascribing effects caused by differences in attenuation to real spectrum differences between the two areas.

The problem of correctly accounting for the attenuation effects becomes a particularly severe restriction when one is considering a surface where the amount of characterizing spectral information contained in its emission is so small that it is comparable with the magnitude of the effects introduced by variations in the atmosphere. Such real, or apparent, paucity of spectral information may be the result of a variety of factors, such as small particle size, a very high degree of compositional heterogeneity within the sampled area, thermal variations, or because the spectral information lies largely outside the atmospheric windows.

In the past, observation of the lunar surface led to the quite general assumption by most authors and particularly by those interested in temperature measurements, that the moon emits as a black or gray body. However, more recent studies based both on laboratory measurements and on direct observations of the moon, indicate that this is not necessarily the case, although the deviation from black or gray body emission does not appear to be large.

It is under conditions such as those mentioned above, namely, when a remote, energy limited, emitting surface is to be observed through a relatively rapidly changing attenuator and/or from a moving observation point, that the advantages of extremely rapid data acquisition afforded by the hereinafter disclosed spectrum matching technique are best utilized. The method is only limited by the quality and quantity of spectral information contained in the emission from the target, by the degree to which this information is available after attenuation, that is, the extent to which there is coincidence between the position of the occurrence of spectral information and the attenuator windows, the signal to noise available from the detection system, and by the appropriateness of selection of the reststrahlen plates with which the data are to be matched.

Accordingly, it is an object of the present invention to provide a technique for collecting data from a series of remotely located targets more quickly than a variable intervening attenuator can change and thereby effect the signal received from the target area.

Another object of the invention is to provide a spectral matching system which is capable of scanning the whole of the spectrum almost instantaneously for each reststrahlen plate in the system, being limited only by the time constant of the detection system.

Still another object of the invention is to provide a spectrum matching technique which allows sampling targets of any shape and size, rather than being forced to select areas which correspond to the shape of spectrometer slits to obtain maximum throughput.

A further object of the invention is to provide a system for rapid remote sensing wherein a minimum of optics and moving parts is required for a spectrum matching instrument requiring only that energy be collected from the target, chopped, and reflected off a reststrahlen plate onto the detecting element.

A still further object of the invention is to provide a technique for obtaining characterizing compositional information about a remote inorganic surface by collecting infrared emission over a specified wavelength interval from a given surface and reflecting it in turn from a series of specified reflecting surfaces, or reststrahlen plates, of known composition until a spectrum match is reached.

These and other objects, features and advantages will become more apparent after considering the following detailed description taken in conjunction with the annexed drawings and appended claims.

In the drawings wherein like reference characters refer to like parts in the several views.

Figure 4:
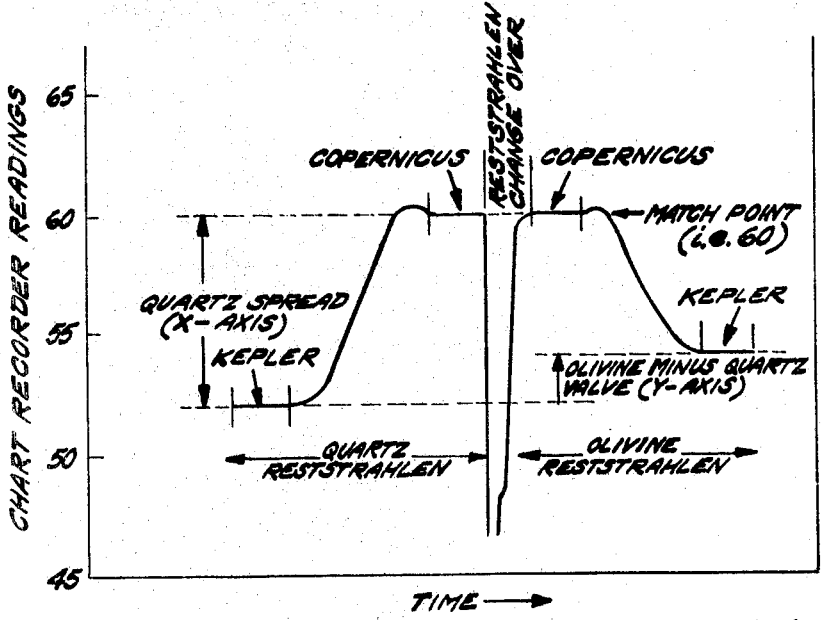
Figure 5:
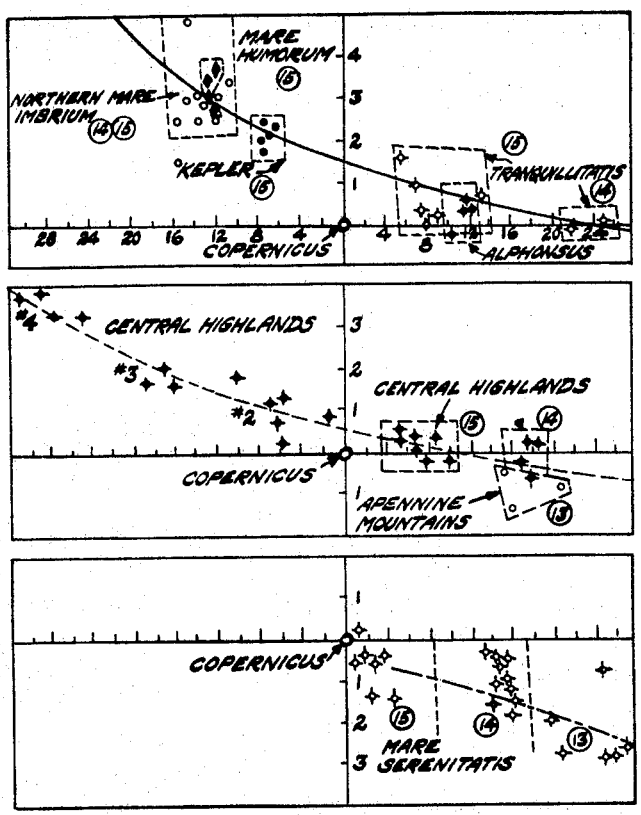

FIGURE 4 is an example of the way in which collected data is illustrated showing the difference in the magnitudes of the signal levels recorded from Copernicus and the target area when their emission is reflected from the quartz reststrahlen, indicated as "quartz spread"; and FIGURE 5 shows the continuous curves drawn through data points obtained from the moon with each set of points for a particular feature being enclosed in a box.

Referring now to the figures, there is shown diagrammatically a spectrum matching instrument constructed of readily available components ready for attachment to a telescope. The instrument is designed to accept an $f/15$ beam 13, which is focussed at a ¼ inch diameter aperture stop 15. A thirteen cycles per second chopper 17 is located immediately in front of the aperture stop 15. This arrangement insures that only the energy entering through the aperture is modulated, so that any emission from the transmission and reflecting filters, optics, and the inside of the instrument will not be included in the detector output as meaningful signal.

A Perkin-Elmer 5 micron cut-on filter 19 is placed immediately after the chopper 17 to restrict the wavelength range. The diverging $f/15$ beam 13 may follow one of two equivalent paths, depending upon the location of the two position IN-OUT plane mirror 21. The beam is then converted to an $f/4.5$ beam by either one of two toroidal mirrors 23 and 25, being refocussed between either of the pairs of reststrahlen plates 27 and 29. Reflection from two surfaces of the same reststrahlen material is used to provide higher spectral purity.

After reflection, the diverging beam is collected by toroidal mirrors 31 and 33 and focussed on the detecting elements of the Golay cells 35 and 37. After preamplification, the output from the Golay cells 35 and 37 passes through a switch 39 so that at any one time the output from either one of the Golays can pass through the common amplifier 41 to the recorder 43. The instrument is extensively baffled.

Figure 1:
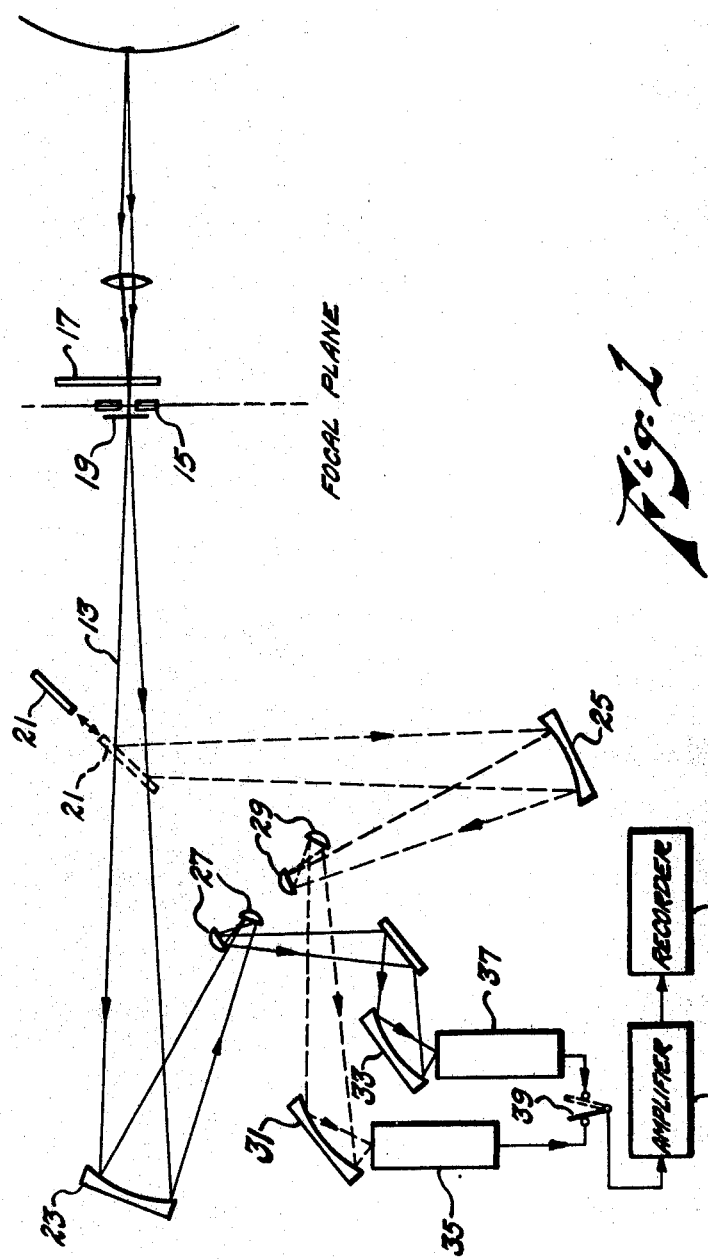
FIGURE 1 is a diagrammatic view of the spectrum matching instrument according to the invention.
Figure 2:
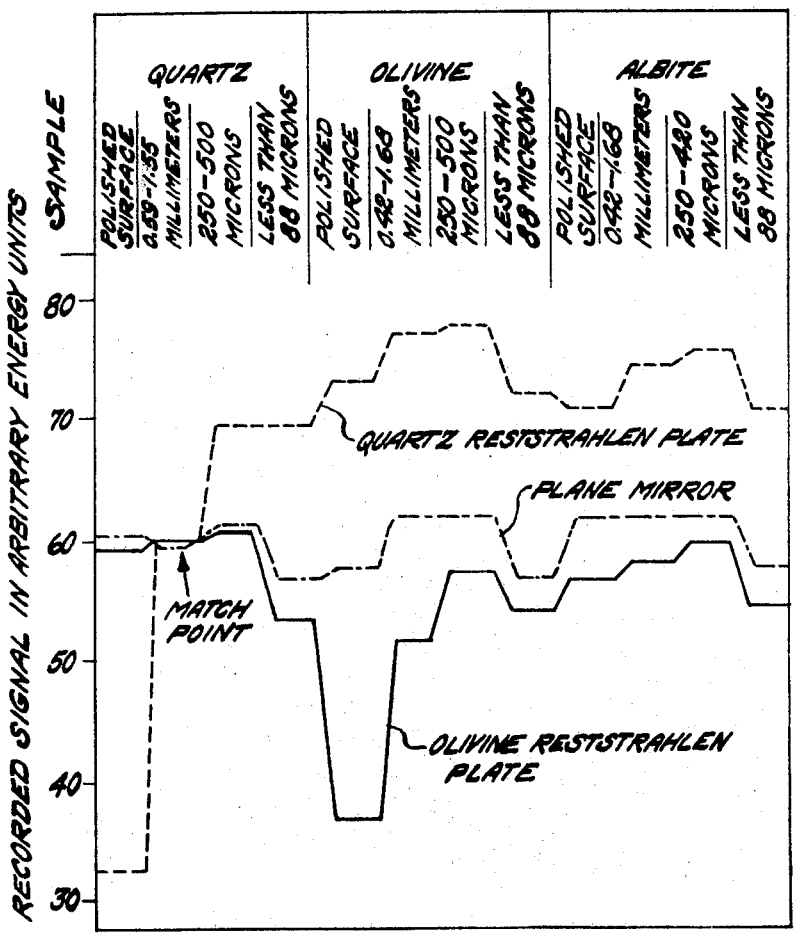
FIGURE 2 is a plotted record of the signal levels obtained on the recorder of the spectrum matching instrument.
Figure 3:
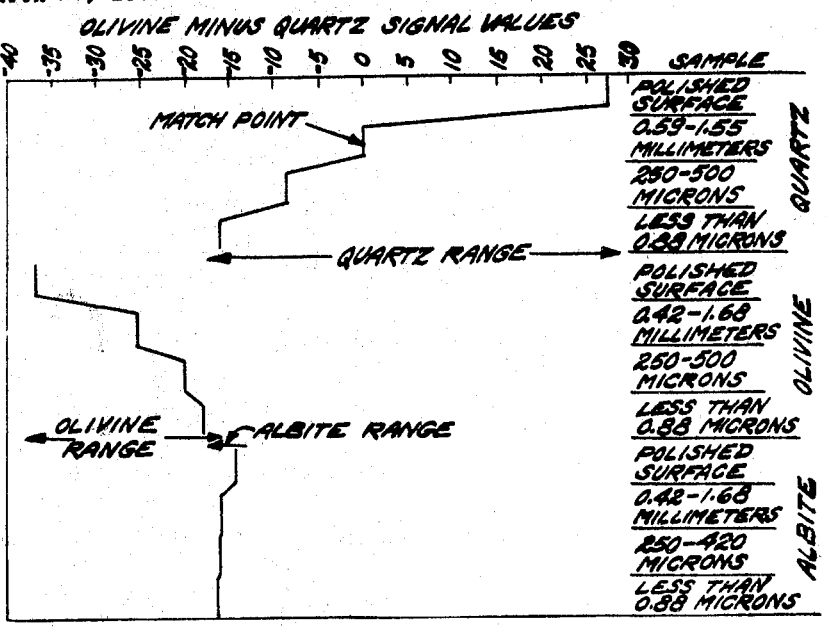
FIGURE 3 is a plotted record of the difference between the magnitude of the olivine and quartz signals from each of the samples shown in FIGURE 2.

In the operation of the instrument in the laboratory, polished plates of olivine and quartz were the reststrahlen materials used and samples of quartz, albite and olivine listed in FIGURES 2 and 3 were examined. These materials were selected because of their suspected similarity to those of which the intended target, the moon, is composed. The samples were imbedded in an aluminum disc which was pivotable so as to be capable of being brought rapidly and reproducibly into inspection position while being heated. The energy emitted from the sample was allowed to pass through a ⅜ inch hole in a water cooled copper plate which shielded the instrument from all other emission except that emanating from the sample and then focussed on the entrance aperture of the spectral matcher.

The sample of coarse quartz consisting of particles lying in the size range 0.59 to 1.55 mm. was arbitrarily selected as a primary reference, or "setting point." The procedure was to record the value of the signal received after the emission from each sample had been reflected from the quartz reststrahlen plate. The emission from the primary reference sample was then reflected from the olivine reststrahlen plate, and the magnitude of this signal was adjusted by altering the amplifier gain such that the signal value was exactly the same as the value of the signal recorded when the emission had been reflected from the quartz reststrahlen plate. A signal value was then recorded at this gain setting for each of the other samples. In this way, the instrument was used to normalize the signals recorded by reflection of the sample emitted energy from the olivine and quartz reststrahlen plates. This procedure was repeated for various gain settings on the instrument, and for different temperatures of the same sample, to provide data which would allow the instrument functions to be evaluated.

An example of the results obtained using the above procedure is shown in FIGURE 2 where the signal levels (after instrumental normalization) obtained on the recorder are plotted. The central set of signals were obtained by reflecting the emission from each sample from a plane mirror, and so indicate the relative radiance of the samples. Because of the method of heating obviously the samples are not at the same temperature. If they were, the radiance levels of samples of the same material would increase as the particle size decreased, because the spectral information content decreases and the sample approaches a black body. These difference in radiance, and the effect of the instrument function will be discussed later. The other two sets of signals were obtained using olivine and quartz reststrahlen plates, the signals from each reststrahlen plate being balanced at a recorder reading of 60 for sample 2. The signal received when the emission from a target is reflected from a quartz reststrahlen plate will be called the "quartz signal" and from an olivine reststrahlen plate, the "olivine signal."

In FIGURE 3 is plotted the difference between the magnitude of the olivine and quartz signals from each of the samples shown in FIGURE 2. As can be readily seen from these differences, or olivine minus quartz values, the magnitude of this difference arranges the samples in order from polished quartz to fine quartz, to fine olivine to polished olivine. The most definitive information (at the two limits) for the olivine minus quartz values is available from polished samples of the two minerals of the same composition as that of the reststrahlen plates, i.e., for minerals having at the same time a maximum spectral content (in the sense that the magnitude of the depths of the characterizing bands in the emission spectrum are a maximum) and an exact spectrum match. For albite, there is also a corresponding gradation of the olivine minus quartz value from the polished sample to a sample of very fine particles size. The difference signals for all samples of very fine particle size are grouped together. This is to be expected, because the more finely ground a particular sample, the less spectral contrast is available in its emission spectrum, and the more nearly it resembles a black or gray body.

It is emphasized that spectrum matching is a technique of comparisons, involving comparisons of the relative magnitudes of the signals obtained when the emission of one target is reflected from a series of different reststrahlen materials, and/or when the emissions from a series of targets are reflected from one reststrahlen material. It is much easier to detect compositional differences among a series of targets, and the general nature of such differences (i.e., acidic or basic rocks) than it is to specifically identify the composition of a given target. The latter involves all the problems of identification encountered in conventional spectroscopy.

The limits of usefulness of this technique, then, are determined primarily by the amount of spectral information available from the target, and upon the choice and the number of reststrahlen plates used. Secondary limits are imposed by the extent to which the instrument function can be evaluated and by the extent to which intervening attenuation can be accounted for.

It is now necessary to consider the functions of the various parameters in the expression which defines the magnitude of the signal recorded. This is given by $$S_{(t)} = \int_{\lambda_1}^{\lambda_2} [N_{bb}(\lambda,t)\{1 - R_s(\lambda)P_s(\lambda)\}A_{(\lambda,t)}K_{(\lambda)}R_R(\lambda)]d\lambda$$

where:

$S_{(t)}$ is the integrated energy signal recorded at time $t$;
$\lambda_1$ and $\lambda_2$ define the limits of the wavelength interval over which the integration is performed;
$N_{bb}(\lambda,t)$ is the black body emission at temperature T;

$R_s(\lambda)$ is the reflectivity of a polished sample of the target material;

$P_s(\lambda)$ is a function included to account for the nonideal surface condition;

$A_{(\lambda,t)}$ is the attenuation function;

$K_{(\lambda)}$ is a general instrument function;

$R_{R(\lambda)}$ is a reflectivity of a particular polished reststrahlen plate used.

The elements of this expression may be considered in terms of their dependence on the target, and the instrument.

The expression $N_{bb}(\lambda,T)\{1-R_{s(\lambda)}P_{s(\lambda)}\}$ defines the radiance of the sampled area on the target. The total energy emitted in a specified wavelength interval is equal to the emission of a black body at the same temperature modified by $R_{s(\lambda)}P_{s(\lambda)}$. For a series of samples of the same composition and temperature the radiance term is to be modified by the value of $P_{s(\lambda)}$, which is 1.0 for a target with a polished surface, and approaches zero as the surface becomes increasingly rough on a micron scale. The relative radiances of 12 samples examined may be obtained from FIGURE 2.

The instrument function is expressed by $K_{(\lambda)}R_{R(\lambda)}$. The constant value which can be assigned to $K_{(\lambda)}$ for a given instrument and specified set of experimental conditions is determined by the spectral dependence of the reflection losses due to all the optics encountered; by the transmission filters used to limit the wavelength range to that where characterizing data is expected; by the spectral response of the detector (which is a linear function for the Golays); and also by the behavior of the entire detector-amplification and recording systems. Any or all of these contributing factors may be altered, in which case a new value for $K_{(\lambda)}$ must be determined. Of course, for all situations the accuracy with which the instrument can be calibrated under actual observing conditions determines how well the instrument function $K_{(\lambda)}$ can be determined.

The other term to be considered in the instrument function is $R_{R(\lambda)}$, the reflectivity of the reststrahlen plate which provides the point at which the spectrum matching technique differs from conventional radiometry.

In a lunar application of the technique, spectrum matching observations of the lunar surfaces using the Perkins 69″ telescope at Lowell Observatory in Flagstaff, Ariz. were made during an April full moon period following similar observations made with conventional spectroscopic techniques. The instrument was used for these observations using dual reststrahlen plates of quartz and olivine. Using a 6.5 mm. diameter aperture in the focal plane of the telescope, a circular spot approximately 70 km. in diameter on the lunar surface was sampled.

The lunar crater Copernicus was used as the reference, or "match point" for all measurements made, both because of its fairly central position on the lunar disc and because of the relative ease with which it could be reproducibly acquired.

The observational procedure was to select some feature on the moon, record the signal obtained by reflecting its emission from the quartz reststrahlen plates, track across the moon to Copernicus, and record the signal produced by reflecting its emission from quartz. The olivine reststrahlen plate was then inserted and the signal received from Copernicus was amplified, so that it exactly matched the previous signal from Copernicus obtained with the quartz reststrahlen plate, thereby instrumentally normalizing the two observations. The original feature was then reacquired by tracking the telescope across the moon and the signal from the feature was recorded after reflection from the olivine reststrahlen plate.

An illustration of this procedure and an example of the way in which the data was collected is shown in FIGURE 4, which also serves to illustrate exactly what has been plotted in FIGURE 5. The difference in the magnitudes of the signal levels recorded from Copernicus and the target area when their emission was reflected from the quartz reststrahlen plate is referred to as the "quartz spread," and so indicated in FIGURE 4, together with "x-axis." These "quartz spread" values are plotted along the abscissa of FIGURE 5. It is an indication of the radiance difference between Copernicus and the target and, if $R_{s(\lambda)}P_{s(\lambda)}$ is small, the difference in temperature between the two features. The value of the difference between the adjusted signals received when the emission from a given target is reflected in turn from the olivine and quartz reststrahlen plates is referred to as the "olivine minus quartz" value, and is indicated as such in FIGURE 4 together with "y-axis." It is this quantity which is plotted on the abscissa of FIGURE 5, and the magnitude of its value for a particular target is indicative of whether a difference in composition, and/or surface condition, exist between that feature and the value of these parameters for Copernicus.

In these preliminary measurements a total of less than two minutes was required to obtain signals from the Copernicus and one other feature's emission reflected from quartz and olivine reststrahlen plates. Most of this time was required for locating Copernicus and relocating the studied feature with the telescope and in this instrument, switching reststrahlen plates and detectors. The two Golay detectors used were also switched so that each was used with both the quartz and olivine reststrahlen plates to eliminate any bias due to using two detectors. All features were repeatedly examined, the method being to proceed from the selected feature to Copernicus, then back to the feature and finally back to Copernicus. In those cases where the values obtained for consecutive signals from Copernicus differed by more than 0.5 of a scale division (y-axis in FIGURE 5), such readings were rejected. These differences were ascribed to fairly rapid fluctuations in the absorption, scattering and emission of the atmosphere.

The curves shown in FIGURE 5 were obtained using Copernicus as a reference point and have already had effects due to the instrument function removed by adjusting all readings to a common Copernicus match point of 60 on the recorder paper. In fact, only measurements made when the Copernicus readings were adjusted at, or very near, 60 have been retained. The signal to noise ratio for the instrument was about 400 to 1.

FIGURE 5 shows the continuous curves drawn through sets of data points obtained from the moon, and each set of points for a particular feature is enclosed in a box. The curves are of the shape shown because of the changing temperature of the features relative to Copernicus (our reference point), which is also changing in temperature due to movement of the subsolar point across the lunar disc during the lunar day. The effect of these temperature changes on the "olivine minus quartz" values is due to the shift of the peak of the black body curve to longer wavelengths at lower temperatures, which alters the magnitude of the signal from one reststrahlen material relative to the other.

Because of this temperature effect, a difference in the "olivine minus quartz" value for features separated along the x-axis are not in themselves meaningful. However, direct comparisons can be made between features in the same position of the x-axis. From FIGURE 5 it appears, for example, that there are significant "olivine minus quartz" differences between Mare Tranquilitatis and Mare Serenitatis, indicating either a difference in composition and/or spectral contrast. A lunar calibration curve was constructed by assuming that the central highlands are homogeneous in composition and particle size and by then examining different areas within the Central Highlands at progressively higher latitudes (and hence lower temperatures). The curve in the central block of FIGURE 5 was constructed in this way, and its consistency with laboratory calibration curves indicates that it is the result of a valid assumption.

The differences recorded in FIGURE 5 lead to the conclusions that features whose "olivine minus quartz" values lie along any one curve have approximately the same value for $R_{s(\lambda)}P_{s(\lambda)}$ and these differences are very small for the features so far examined on the moon in this way, indicating a general condition of low spectral content for lunar surface materials. This, in turn, indicates a rough surface for these materials on a micron scale.

Although the invention has been illustrated and described in terms of a preferred embodiment thereof, it will be apparent to those skilled in the art that certain changes, alterations, modifications and substitutions, can be made in the arrangement of the various elements without departing from the true spirit and scope of the appended claims. For example, a modified infrared camera may be substituted for the applicant's instrument and, by utilizing the spectral matching technique herein disclosed, useful results can be obtained for thereby determining compositional characteristics of the lunar surface.

Having thus set forth and disclosed the nature of my invention, what I claim and desire to secure by Letters Patent of the United States is:

1. A system for determining the compositional characteristics of remotely positioned targets composed of inorganic materials comprising a target source having a low energy level emission spectrum, an optical system, a chopper interposed in the path of the energy from said target for intermittently interrupting the energy flow therefrom, an aperture stop disposed on the focal plane of the optical system, a cut-on filter in the energy path immediately behind said aperture stop, an in-out plane mirror for insertion into the path of the radiant energy from the target, said in-out mirror being removable from the energy path, a first toroidal mirror positioned to receive the radiant target signal when said in-out plane mirror is out of the energy path, a first pair of reststrahlen plates in position to reflect the energy received from said first toroidal mirror, a fixedly positioned plane mirror located in the optical path of the signal for diverting the energy signal 90 degrees, a second toroidal mirror positioned to receive the signal from the fixedly positioned plane mirror causing said signal to be converged to a point, a first Golay cell for receiving the converged signal from the second toroidal mirror, a third toroidal mirror positioned to receive the reflected radiant energy from said in-out plane mirror when said in-out mirror is in the energy path, a second pair of reststrahlen plates in position to receive the signal from said third toroidal mirror, a fourth toroidal mirror positioned to receive the energy signal from said second pair reststrahlen plates converging said signal to a point, a second Golay cell for receiving the converged signal from said fourth toroidal mirror, preamplifier means associated with said Golay cells for enhancing the energy signal, amplifier and recorder means for amplifying and displaying the energy signal received from said Golay cells, the displayed signal being an indication of the degree of matching of the known material from which the reststrahlen plates are composed and the unknown target material.

2. The system for determining compositional characteristics defined in claim 1 wherein a two-position switch is interposed between the Golay cells and the amplifier, said two-position switch operating to connect the first Golay cell to the amplifier in one position and to connect the second Golay cell to the amplifier when switched to the other position.

3. The system for determining compositional characteristics defined in claim 1 wherein the first pair of reststrahlen plates is composed of quartz and the second pair of reststrahlen plates is composed of olivine, both pairs of reststrahlen plates being polished to provide a flat reflective surface.

References Cited

UNITED STATES PATENTS 3,278,746  10/1966  Fiat.

RONALD L. WIBERT, Primary Examiner

V. P. McGRAW, Assistant Examiner

U.S. Cl. X.R.

250—83.3, 220; 356—93